(12) United States Patent
Fausto et al.

(10) Patent No.: US 7,726,178 B2
(45) Date of Patent: Jun. 1, 2010

(54) SYSTEM AND METHOD OF NON-INVASIVE CONTROL OF APPARATUS TIGHTNESS

(75) Inventors: Pirovano Fausto, Rho (IT); Nava Luigi, Luino (IT)

(73) Assignees: Andrew Telecommunication Products S.r.l., Agrate Brianza (IT); NTI New Technologies for Industry S.A., Riva San Vitale (CH)

( * ) Notice: Subject to any disclaimer, the term of this patent is extended or adjusted under 35 U.S.C. 154(b) by 188 days.

(21) Appl. No.: 11/806,494

(22) Filed: May 31, 2007

(65) Prior Publication Data

US 2008/0038096 A1    Feb. 14, 2008

(30) Foreign Application Priority Data

Jun. 9, 2006  (IT) .......................... MI2006A1121

(51) Int. Cl.
*G01M 3/02* (2006.01)
(52) U.S. Cl. .............................................. 73/37; 73/40
(58) Field of Classification Search ...................... 73/37, 73/40
See application file for complete search history.

(56) References Cited

U.S. PATENT DOCUMENTS

| | | | | |
|---|---|---|---|---|
| 4,378,692 A * | 4/1983 | Walle | .......................... | 73/49.2 |
| 4,768,518 A | 9/1988 | Peltonen et al. | | |
| 4,858,463 A * | 8/1989 | Rosse et al. | .................. | 73/49.3 |
| 5,461,901 A * | 10/1995 | Ottestad | ...................... | 73/1.63 |
| 5,915,270 A * | 6/1999 | Lehmann | ...................... | 73/49.2 |
| 6,662,634 B2 * | 12/2003 | Lehmann | .................... | 73/49.2 |
| 6,877,356 B2 * | 4/2005 | Lehmann | .................... | 73/1.62 |
| 7,013,712 B2 * | 3/2006 | Lehmann | .................... | 73/49.2 |
| 7,174,772 B2 * | 2/2007 | Sacca | .......................... | 73/49.2 |
| 2005/0183821 A1 | 8/2005 | Parsons | | |
| 2006/0021970 A1 | 2/2006 | Parsons | | |
| 2006/0112759 A1 * | 6/2006 | Lehmann | .................... | 73/49.2 |

FOREIGN PATENT DOCUMENTS

WO    WO 2005/074119    8/2005

\* cited by examiner

*Primary Examiner*—Hezron Williams
*Assistant Examiner*—Rodney T Frank
(74) *Attorney, Agent, or Firm*—Dickstein Shapiro LLP

(57) ABSTRACT

System for the non invasive control of the tightness condition of apparatus, in particular of the constancy of said condition of m homogenous series, each one of n apparatus, which in the absence of said pressure constancy would have not acceptable, not uniform characteristics and performances, especially of electronic mechanical, hydraulic and similar apparatus. The system includes (a) a first sub system including a pneumatic chamber, set at a sampling reference pressure, for the pressure control of each one of said n apparatus of each one of said m homogenous series; (b) a second sub system of treatment and feeding of pneumatic fluid to said chamber in order to support and stabilize said reference pressure; and (c) a third sub system of comparison and detection of undesired deviations over said reference pressure, of the detected pressure in the chamber occupied, on turn, by each one of the n apparatus of each of the m series.

7 Claims, 4 Drawing Sheets

SYSTEM AND METHOD OF NON-INVASIVE CONTROL OF APPARATUS TIGHTNESS

BACKGROUND OF THE INVENTION

1. Field of the Invention

The present invention concerns a non-invasive control system of the tightness of apparatus (and/or relative containers) to be kept air-, water-tight.

More particularly the invention refers to a system, method and equipment for the tightness non-invasive control of electronic, electric, mechanical, chemical devices (preferably inserted in mechanic containers) whose functional characteristics and performances can vary also considerably when their tightness varies.

2. Description of the Related Art

Apparatus consisting of circuits (like electronics), devices, components, etc., also of high precision (and costs) are widely diffused (and they diffuse at an exponential speed). But unfortunately they are susceptible to modify their functionality, way of acting, performance at the variation of their exposure to environmental conditions, and, consequently, of their isolation from the above mentioned conditions, and therefore of their tightness to rain, vapours etc.

Just to fix the ideas, it can be referred to an emblematic embodiment concerning the application of said system to the non invasive control of electronic sets, in particular the so-called TMA (Tower Mounted Amplifier), comprising filters and amplifiers of reception and of transmission (in addition to the conventional feeding- and emergency-devices, such as anti-lightening devices), to be associated to base stations of mobile telephony communication. These (and other) sets are generally locked up in containers/boxes that must substantially assure perfect seal conditions of the electronic equipment which, otherwise, vary their characteristics to varying of their tightness changing therefore the parameters of the transmission.

We may refer emblematically to said TMA because their air-, water-tight condition is at risk, as they are placed outdoor, on the platform of the antenna tower, and not anymore in the shelter of the base station, which compelled to the use of connecting cables between the antenna on top of the tower and the filtration-, amplification-, circuits, etc., on the ground.

PRIOR ART

Normally apparatus to be kept permanently air-, water-tight, were submitted to a preliminary control of their condition by making for example a hole in the apparatus or in its carcass, for feeding therein a pressure fluid (generally compressed air) that made it possible to assess, or not, the constancy of the conditions within the apparatus and/or container thereof. This method required therefore the perforation of a part (even if minimal) of the apparatus (or its container and boxes) which at the end of the control had to be closed again with extreme care. It was a matter of a decisively invasive procedure, time-and-money consuming, and moreover, not at all safe. Generally it was about the same conventional methods used in a non invasive way, for example in the automatic measurement of blood pressure (U.S. Pat. No. 4,768,518), in controlling motors that are driven by direct current without brushes (WO2005/074119), in the devices of the annular chromatography regarding the measurements and non invasive analysis of the plasma parameters of semi conductors (US2006/021970, US2005/183821), in the non invasive control of filters (JP 300886) etc. Notwithstanding the best efforts and high costs, these systems as well as other similar conventional methods, did not seem to have resolved radically the problem of the totally non-invasive control of the tightness of apparatus, which, even if protected by special containers, but if exposed to the inclemency of weather, easily vary their functional characteristics to the varying of their own tightness. What above said refers to the single apparatus, but what most counts here, is the constancy of said tightness of, for example, m series of apparatus each consisting of n apparatus.

SUMMARY OF THE INVENTION

The first object of the present invention is to provide a control system of totally non invasive measurements, that is free of the inconveniences of the Prior Art, is simple, effective and easy to be embodied.

Another object of the invention is to provide a system of the universal and flexible type, particularly in the sense of being independent from any local environmental situation, such as conditions and parameters like temperature and humidity of the environment, which otherwise would require continuous and time demanding adjustments, and therefore zero setting and re-starts of the equipment.

Furthermore, the system of the present invention has to be suitable even to "multiplexing" in the sense that several apparatus, or more exactly, several apparatus couples can be controlled simultaneously and alternatively i.e. independently from the dimensional diversity and functionality of said n apparatus of said m series.

Still another purpose of the invention is a method which is applicable analogically to the various structures of the systems and of the apparatus, independently from their functional and dimensional diversities.

The main features and characteristics of the invention are recited in the claims at the end of this description, which however are considered herewith incorporated.

In synthesis, the system of non-invasive control and verification of the pressure tightness according to the invention, is based on the concept of the volume difference, according to which in a watertight chamber with a defined pressure, constant pressures corresponds substantially to constant volumes.

In a particularly advantageous and therefore preferred embodiment of the invention, the system of the non-invasive tightness control of said apparatus (and/or their containers), in particular of the constancy of said tightness of m homogenous series (each of n apparatus), which in the absence of said pressure constancy would give unacceptable, non-uniform performances, is characterized at least by:

- a first sub system comprising a pneumatic chamber set at a sampling reference pressure (prif), for the pressure control of the n apparatus of each of the m homogenous series;
- a second sub system of treatment and feeding of pneumatic fluid (generally compressed air) to the chamber of said first sub system in order to support and stabilize said reference pressure; and
- a third sub system of comparison and detection of undesired deviations over said reference pressure, of the detected pressure in the chamber occupied, on turn, by each one of the n apparatus of each of the m series;

The invention also comprises a method of control and measurement of the air-, water, -tight condition, especially of the constancy and uniformity of said seal condition of m homogenous series each of n electronic, electric, mechanic, hydraulic and similar, apparatus, said method comprising at least:

a sampling/calibration phase with the aid of at least one of the n apparatus of each of the m series;

a detection phase of a reference pressure (prif) on only one apparatus of each one of the m series, whereby the pressures of a plenum chamber and of a pneumatic chamber are set to said detected pressure;

stabilization of this pressure;

insertion on turn of each one of the n apparatus of said m series, in said pneumatic chamber;

comparison with said reference pressure, of the pressures measured in the containment chamber on each one of the n apparatus of each one of the m series; and elimination of an apparatus in case of shifting of its measured pressure over said reference pressure.

BRIEF DESCRIPTION OF THE DRAWINGS

The various aspects and advantages of the invention will clearly appear from the description of the embodiments represented in the accompanying drawings in which.

DETAILED DESCRIPTION OF THE PREFERRED EMBODIMENT

Figure 1:
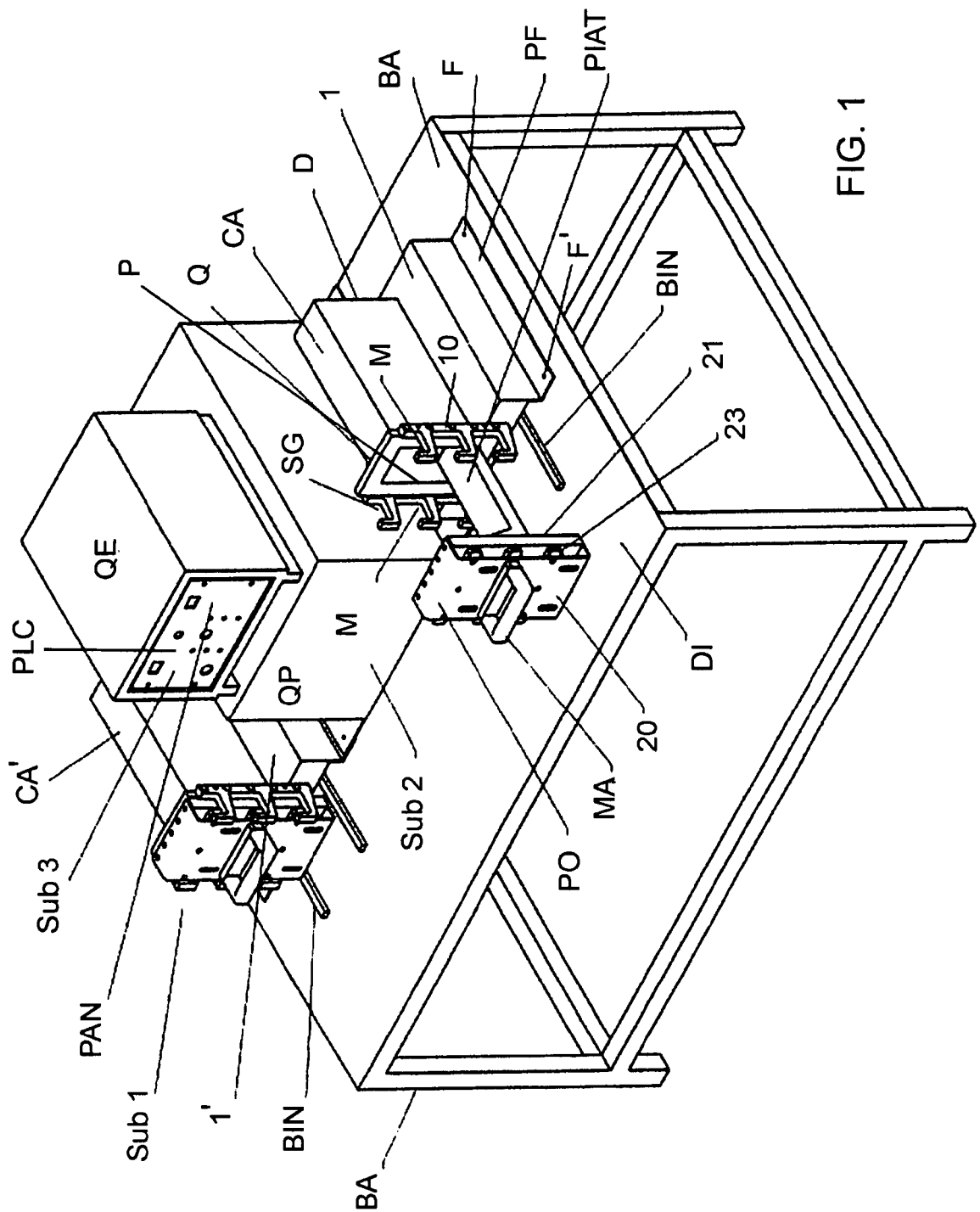
FIG. 1 is a perspective view of the system according to the invention, in the preferred but not exclusive version of two pneumatic chambers working in alternance.

FIG. 1 shows a preferred (but not limitative) embodiment of the system according to the invention, including a table or base plate BA, on which two pneumatic chambers CA-CA' are arranged (symmetrically with regard to the central axis X-X); each chamber is on a support, (1-1') which has a L-shape and is integral with said table BA by (not shown) screws inserted in the holes FF in the inferior wing PF of said L-support.

Characteristically each pneumatic chamber CA-CA' is open at the proximal end P, is closed at the distal end D and shows a strengthened panel or frame Q on the opening P, at whose sides are fixed small "squarings" M having overhanging claws SG. During work, the opening P is closed by an external door PO from which a handle MA leans out. Said door PO has preferably a drummed wall i.e., it has two detached walls 20, 21 and in between them, there are shear pins 23 that engage with said claws SG in the closing phase, securing (as, for example, in a safe) a sure watertight lock.

A platform PAT to receive the TMA to be tested is integral with the inner face of the door PO and slides on a mechanism comprising the rail BIN. QP indicates the container of the pneumatic components and QE indicates the container of the electric components.

In a preferred embodiment both components QE and QP are compacted in a single structure, as f.i. in an apparatus of the line commercialized by ATEQ Systems Analitiques Italy S.r.l., in Milano, via Cascina Belcasale 5.

In FIG. 1 two pneumatic chambers are indicated in parallel, one of which CA is open, i.e. is in the extraction phase of a just tested apparatus (for example TMA), and the other one CA' is closed, i.e. is in the control phase: obviously said chambers can be an homogenous series, whereby a highly productive multiplex can advantageously be brought about.

Figure 2:
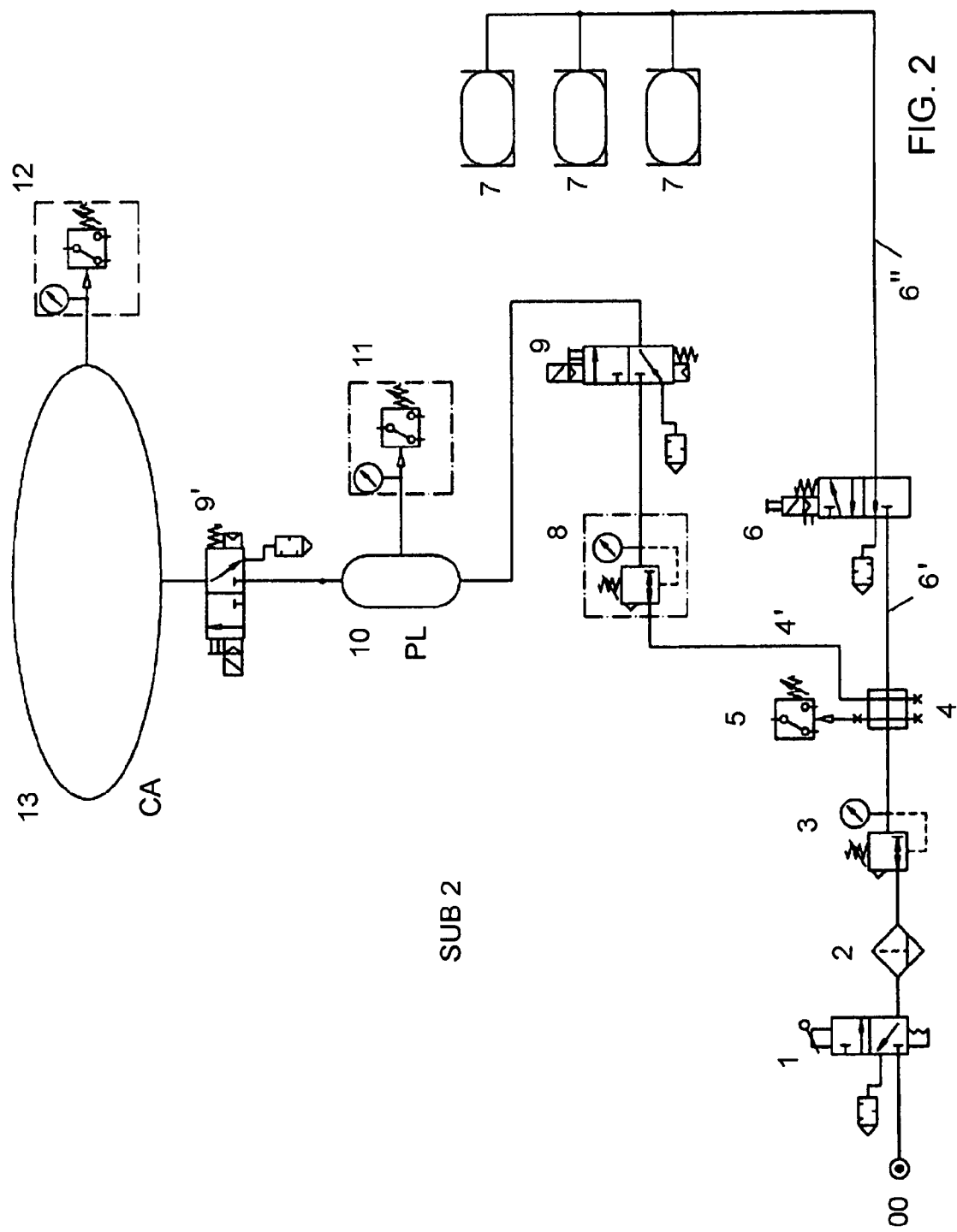
FIG. 2 is a diagrammatical scheme of the pneumatic circuit.

FIG. 2 represents the pneumatic scheme in which following numeral references indicate respectively: (00) the connection to a compressed fluid (air) source, (1) the interdiction electro-valve of the pneumatic air and (2) a condensate discharger, (3) a pressure-gauge (manometer) that can be assembled with the electro-valve (1) and the dischanger (2) forming a pressure regulator, (4) is a deriving circuit combined with an air pressure switch (5). The line (4') is connected to another air pressure switch (8) (sensor) connected to an air-interdiction electro-valve (9) connected on its turn to an air plenum chamber PL (10) provided with an air pressure sensor (11), and connected by means of the electro-valve (9') to the pneumatic chamber (13). CA is also provided with the air pressure switch (12). The line (6') at the output from the circuit (4) is connected by means of the closing electro-valve (6) and the line (6") to the closing shutter (7) of the chamber (13).

For reasons of descriptive concision and simplification FIG. 2 represents a pneumatic circuit for one single chamber (for example (13) CA) in which each one of said n apparatus (TMA) will be inserted for the non invasive control of its tightness.

Obviously the pneumatic circuit for two (or more) chambers will show a higher number of actuators (7) and electro-valves (9), but preferably one single plenum chamber adequately driven by electro-valves.

Figure 3:
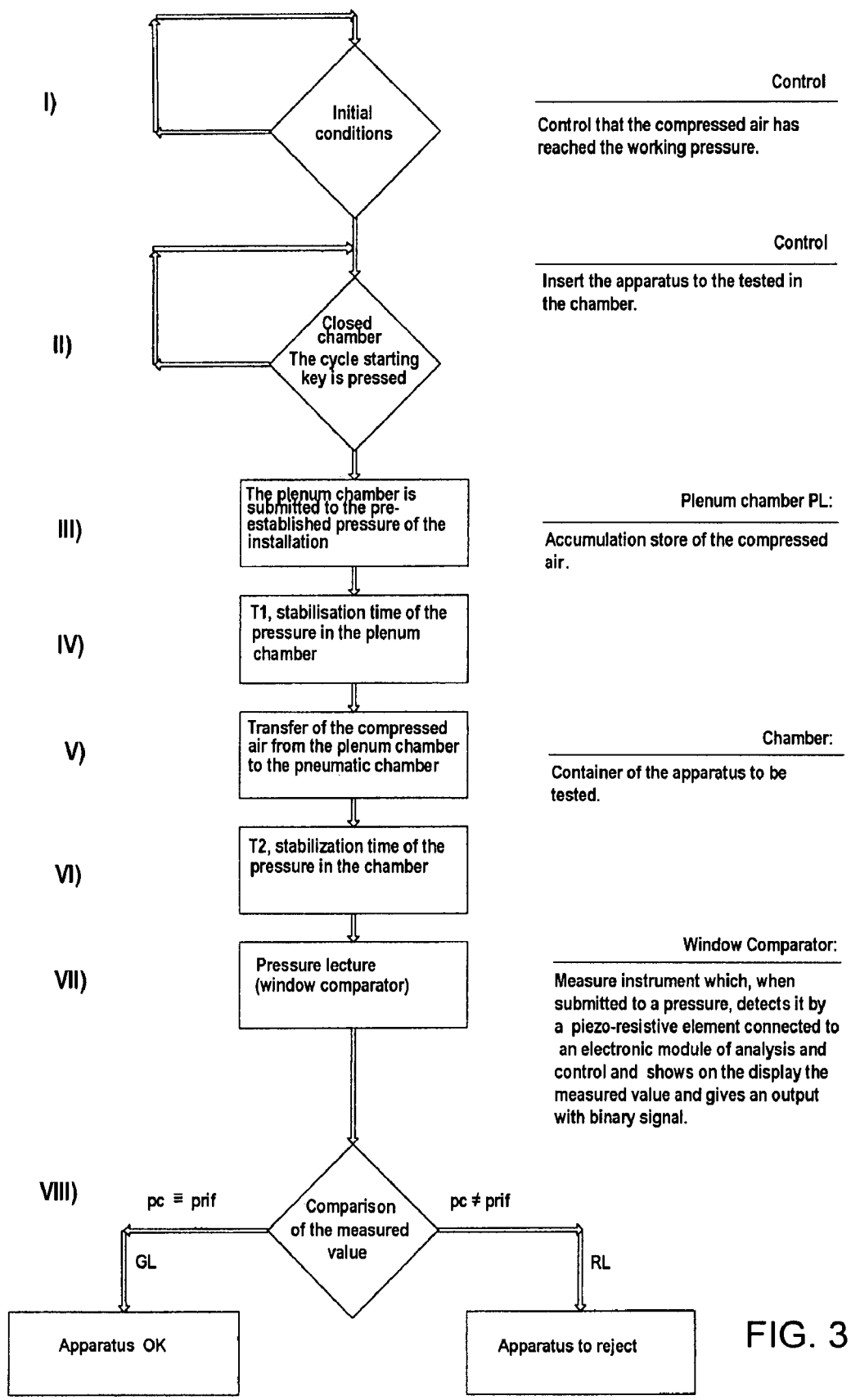
FIG. 3 is an operational scheme of the system.
Figure 4:
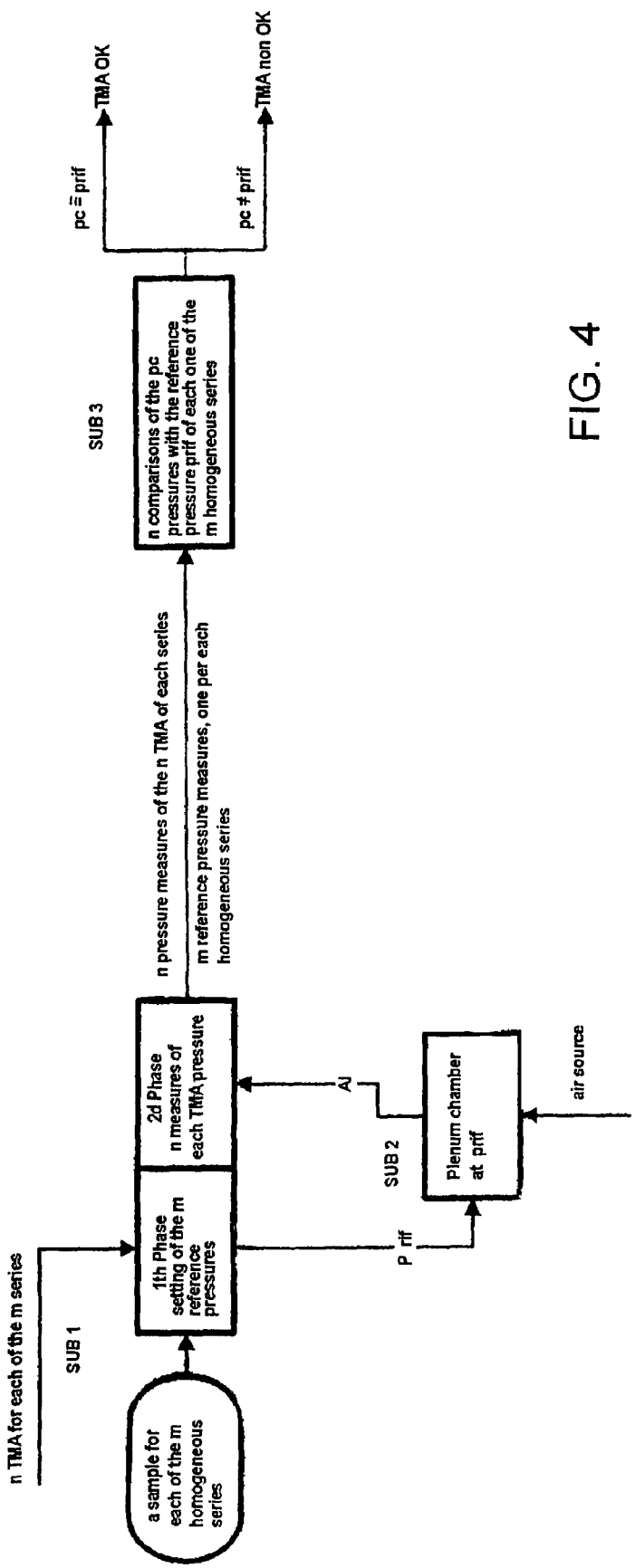
FIG. 4 is a block scheme of the system, described in terms of sub systems, in order to also delineate the method thereof.

FIG. 4 is a flow sheet of a system and corresponding method substantially consisting of three sub systems:

SUB 1, sub system acting in two phases, i.e. a first phase of sampling the reference pressure (prif) in the pneumatic chamber CA which is provided with said means of closure consisting of the panel or frame Q with hooks SG, and door PO with latches and shear pins 23 at the inside of the wall; second phase: pressure control (pc) of each and any of the n apparatus of said m series;

SUB 2, sub system of feeding and regulation of the compressed air, for example like the one described in FIG. 3; and SUB 3, sub system of comparison with the sampled pressure (prif), of the measured pressure (pc) for each and any apparatus introduced in the pneumatic chamber.

FIG. 3 specifies that in order to compare the measured pressure (pc) with the reference one (prif), it is preferred to use an instrument with a piezo resistive element connected to an electronic module of analysis and control, that shows the measured value on a display as a binary signal. Instruments of this type are already known per se and therefore do not require detailed descriptions and illustrations.

The method according to the invention can be deducted (beside from FIG. 3) also from the block scheme of FIG. 4 where: in I) it is established and verified that the air has reached the reference or working pressure (prif); in II) the first one of said n apparatus (TMA) will be inserted into the pneumatic chamber which will be thereafter closed; in III) air will be fed into the plenum chamber PL acting as accumulation store at the set pressure (prif); in IV) said air will be stabilized in a time T1; in V) said compressed air is being transferred from the plenum chamber PL into said pneumatic chamber; in VI) it will be stabilized in a time T2; in VII) said measured pressure (pc) is read; and in VIII) said pressure (pc) will be compared with the reference pressure (prif): if pc=prif the apparatus is accepted, if pc is different from prif the apparatus has to be discarded.

The specific procedure for the control of the TMA can be summarized as follows:

1. with the aid of an electro-valve, compressed air will be introduced into the plenum chamber PL and brought to a pre-established pressure: once said pressure is reached, an other electro-valve opens and introduces air in the pneumatic chamber (CA-CA') where the TMA to be verified has been inserted.

2. A pressure detector will measure the air introduced into said chamber CA-CA' and a digital display PLC will visualize the instant value of said pressure. Said PLC develops an integral of continuous measurements at different times.

3. After approximately 15 time second, when the internal pressure of the plenum chamber PL and of the chamber CA have been stabilized, said electro-valve interrupts the filling, and isolates said chamber CA. The PLC registers the pressure (pc) of the air which has been introduced into the container.

4. The PLC confronts said air pressure (pc) which has just been measured, with the set value (prif) (in function of the TMA code of the m series). When the TMA is at tightness, the two values coincide (within a tolerance of +/−0.02 bar), the green lamp goes on and says that the apparatus is OK. If the TMA is not at tightness, the red lamp goes on, warning acoustically that the apparatus is not OK. To simplify, for each of said m series is established a reference pressure (prif), thus m prif are sampled. For each one of said m prif n control pressure will be measured, thus n, m (pc) are established.

5. The chamber pressure discharges automatically and the locking of the slide valve sets itself free.

6. The container opens and the TMA can be removed.

All the electrical elements requested for the unit control, i.e. memories, programs, lines in-and out, control devices etc. are integrated in said electrical board QE whose operative panel PAN includes at least the switching-on push buttons, the buttons of reset and start cycle, an emergency stop key, a digit selector of the slide-valve, shining warning lights and yellow light emitting diodes for the operation of CA and CA', green light emitting diodes for the accepted pieces in CA and CA', a red light emitting diode for the discarded pieces, as well as an acoustic warning for each discarded piece.

As anticipated all the necessary pneumatic elements to be controlled are integrated in the pneumatic frame QP which, on its turn, can be compacted with the electric frame QE. These frames and panels can have any desired form and structure, they can even be of a commercial use. After all they are not part of the inventions "core", and they don't request any particular description.

For scruples of illustrative clarity the invention has been described with reference to the embodiments represented in the accompanying drawings however these embodiments are susceptible to all the variants, modifications, additions and similar, which are in the hand reach of a mean skilled technician of this field, whereby these changes have to be considered included and/or falling within the scope and the spirit of the present invention.

What is claimed is:

1. System for the non invasive control of the tightness condition of apparatus and/or relative containers, in particular of the constancy of said condition of m homogenous series, each one of n apparatus, which in the absence of said pressure constancy would have not acceptable, not uniform characteristics and performances, especially of electronic mechanical, hydraulic and similar, apparatus, comprising:

a first sub system comprising a pneumatic chamber, set at a sampling reference pressure, for the pressure control of the n apparatus of each of the m homogenous series, wherein the first sub system includes:
 a pneumatic chamber closed at its distal end and open at its proximal end, the proximal end of the chamber being provided with hooks;
 means for cadenced mechanized or robotized insertion of said n apparatus of each one of said m series in said chamber;
 and means for the tight closure of said chamber after each insertion of an apparatus "on duty" comprising a door provided with an external handle on a drummed double wall, within which shear pins and door latches are disposed which, under the action of said handle, engage solidly with said hooks;

a second sub system of treatment and feeding of pneumatic fluid (generally compressed air) to the chamber of said first sub system in order to support and stabilize said reference pressure; and a third sub system of comparison and detection of undesired deviations over said reference pressure, of the detected pressure in the chamber occupied, on turn, by each one of the n apparatus of each of the m series; and a platform to support each apparatus, sliding on a rail for the transport of said "on duty" apparatus at the inside of the chamber.

2. System for the non invasive control of the tightness condition of apparatus and/or relative containers, in particular of the constancy of said condition of m homogenous series, each one of n apparatus, which in the absence of said pressure constancy would have not acceptable, not uniform characteristics and performances, especially of electronic mechanical, hydraulic and similar, apparatus, comprising:

a first sub system comprising a pneumatic chamber, set at a sampling reference pressure, for the pressure control of the n apparatus of each of the m homogenous series;

a second sub system of treatment and feeding of pneumatic fluid (generally compressed air) to the chamber of said first sub system in order to support and stabilize said reference pressure, wherein the second sub system includes for each pneumatic chamber at least:
 one tank of pneumatic fluid; one plenum chamber; pressure regulators and reducers;
 at least two interdiction electro-valves of the pneumatic air;
 at least one chamber locking electro-valve; one deviation valve; one condensation discharger;
 at least three air pressure valves; and a third sub system of comparison and detection of undesired deviations over said reference pressure, of the detected pressure in the chamber occupied, on turn, by each one of the n apparatus of each of the m series.

3. System for the non invasive control of the tightness condition of apparatus and/or relative containers, in particular of the constancy of said condition of m homogenous series, each one of n apparatus, which in the absence of said pressure constancy would have not acceptable, not uniform characteristics and performances, especially of electronic mechanical, hydraulic and similar, apparatus, comprising:

a first sub system comprising a pneumatic chamber, set at a sampling reference pressure, for the pressure control of the n apparatus of each of the m homogenous series;

a second sub system of treatment and feeding of pneumatic fluid (generally compressed air) to the chamber of said first sub system in order to support and stabilize said reference pressure; and a third sub system of comparison and detection of undesired deviations over said reference pressure, of the detected pressure in the chamber occupied, on turn, by each one of the n apparatus of each of the m series, wherein the third sub system contains at least a pressure detector with a piezo resistive element, connected to an electronic analysis and control module, provided with a measured value display and a converter A/D.

4. System for the non invasive control of the tightness condition of apparatus and/or relative containers, in particular of the constancy of said condition of m homogenous series, each one of n apparatus, which in the absence of said pressure constancy would have not acceptable, not uniform characteristics and performances, especially of electronic mechanical, hydraulic and similar, apparatus, comprising:
  a first sub system comprising a pneumatic chamber, set at a sampling reference pressure, for the pressure control of the n apparatus of each of the m homogenous series;
  a second sub system of treatment and feeding of pneumatic fluid (generally compressed air) to the chamber of said first sub system in order to support and stabilize said reference pressure; and
  a third sub system of comparison and detection of undesired deviations over said reference pressure, of the detected pressure in the chamber occupied, on turn, by each one of the n apparatus of each of the m series,
characterized by a multiplex structure, particularly of chamber couples, operating in time division.

5. System for the non invasive control of the tightness condition of apparatus and/or relative containers, in particular of the constancy of said condition of m homogenous series, each one of n apparatus, which in the absence of said pressure constancy would have not acceptable, not uniform characteristics and performances, especially of electronic mechanical, hydraulic and similar, apparatus, comprising:
  a first sub system comprising a pneumatic chamber, set at a sampling reference pressure, for the pressure control of the n apparatus of each of the m homogenous series;
  a second sub system of treatment and feeding of pneumatic fluid (generally compressed air) to the chamber of said first sub system in order to support and stabilize said reference pressure; and
  a third sub system of comparison and detection of undesired deviations over said reference pressure, of the detected pressure in the chamber occupied, on turn, by each one of the n apparatus of each of the m series,
wherein said n apparatus of each one of said m series, to be controlled are trans-receiver devices of multiple signals of cellular telephony (so called TMA, Tower Mounted Amplifier) to be associated to antenna platform on top of towers, or on piles, exposed to atmospheric changes and to the inclemency of weather.

6. Method for the non invasive control and verification of the tightness, particularly of the conformity and uniformity of the watertight condition of m homogenous series each of n electronic, mechanic, hydraulic and similar, apparatus comprising:
  a sampling/calibration phase with the aid of at least one of the n apparatus of each of the m series;
  a detection phase of a reference pressure (prif) on only one apparatus of each one of the m series, whereby the pressures of a plenum chamber and of a pneumatic chamber are set to said detected pressure;
  stabilization of this pressure;
  insertion on turn of each one of said n apparatus of said m series, in said pneumatic chamber;
  comparison with said reference pressure, of the pressure measured in the containing chamber on each one of said n apparatus of each one of said m series;
  elimination of an apparatus in case of shifting of its measured pressure over said reference pressure;
  wherein the control is carried out as in a time division multiplex by forming n/2 couples of said n apparatus and by executing n/2 operations for each of said m series.

7. Method according to claim 6, characterized in that it is independent from the environmental conditions of the location in which it is carried out.

* * * * *